No. 629,952. Patented Aug. 1, 1899.
W. A. CLATWORTHY.
MEANS FOR DRIVING MACHINES AT VARIABLE SPEEDS BY ELECTRIC MOTORS.
(Application filed Mar. 8, 1899.)
(No Model.) 3 Sheets—Sheet 1.
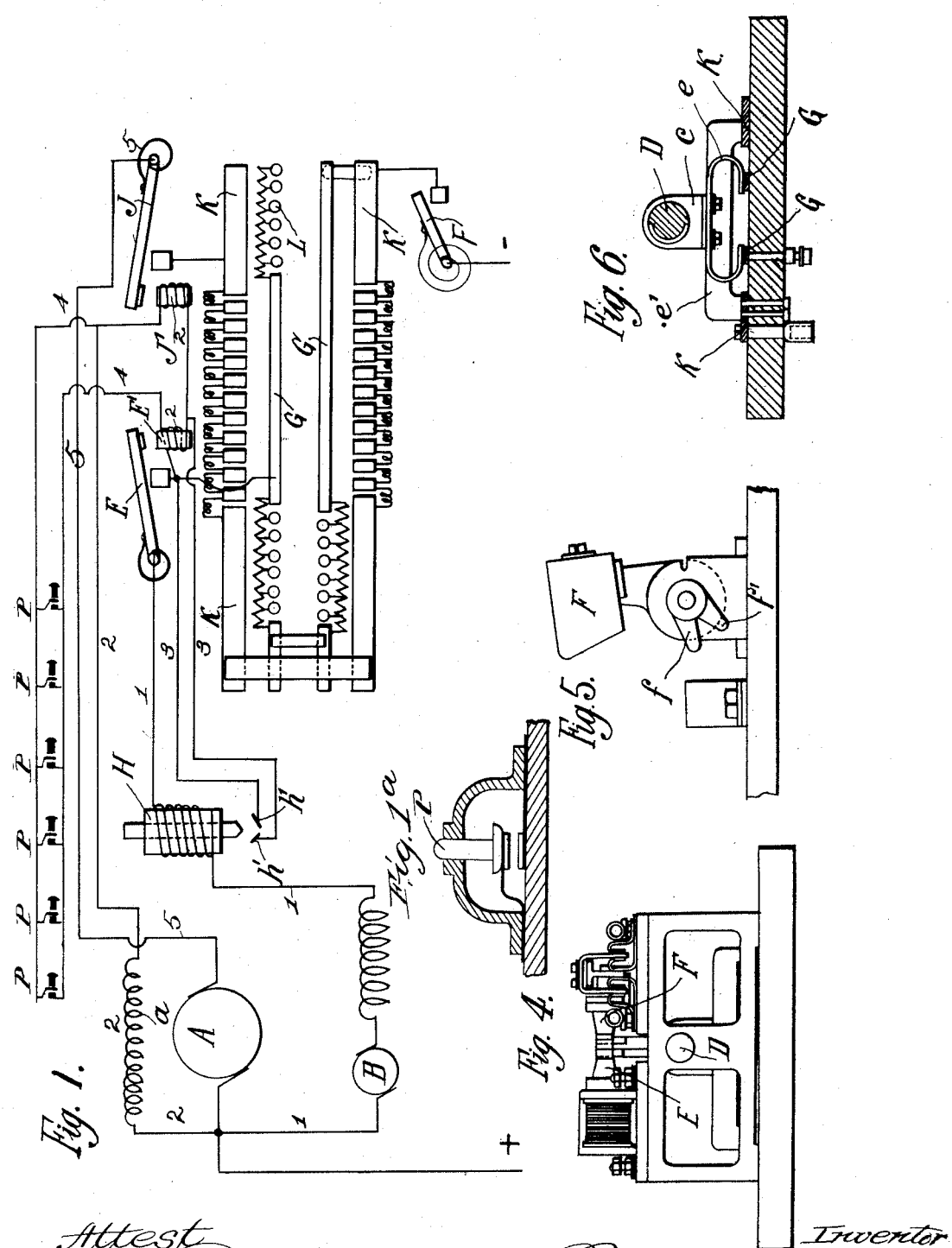

No. 629,952. Patented Aug. 1, 1899.
W. A. CLATWORTHY.
MEANS FOR DRIVING MACHINES AT VARIABLE SPEEDS BY ELECTRIC MOTORS.
(Application filed Mar. 8, 1899.)
(No Model.) 3 Sheets—Sheet 2.
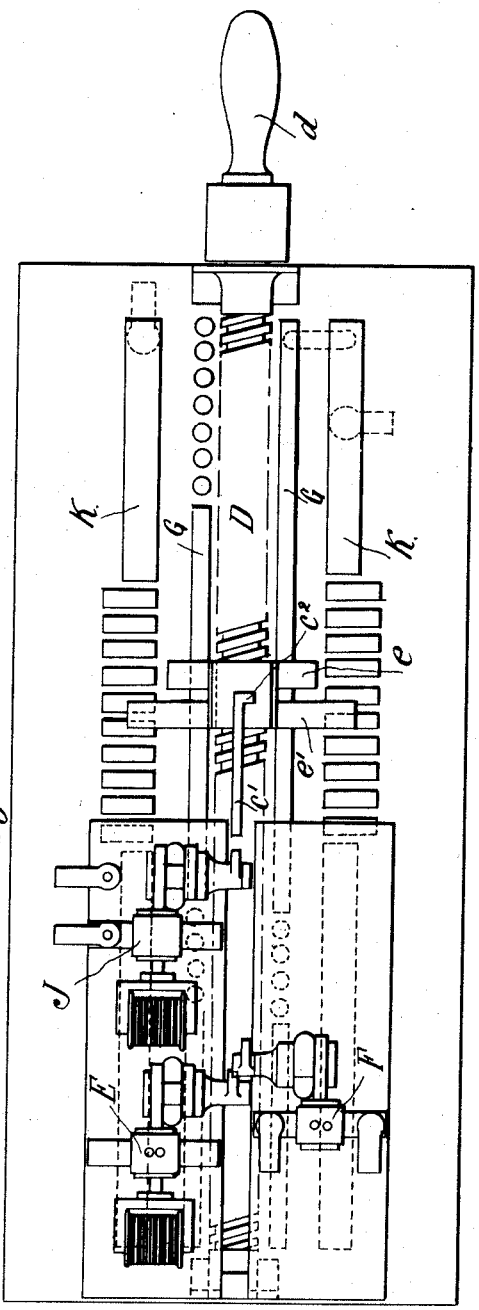
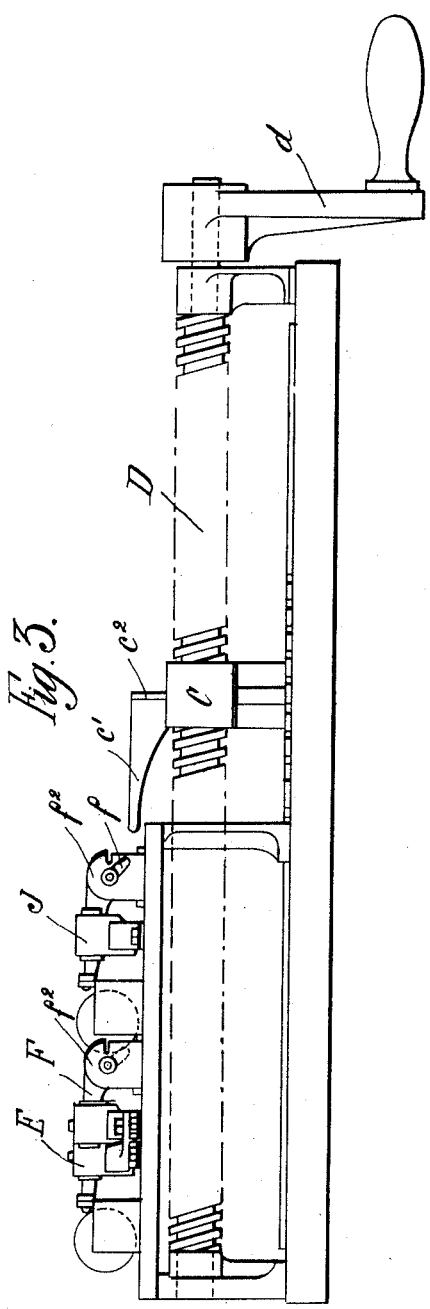

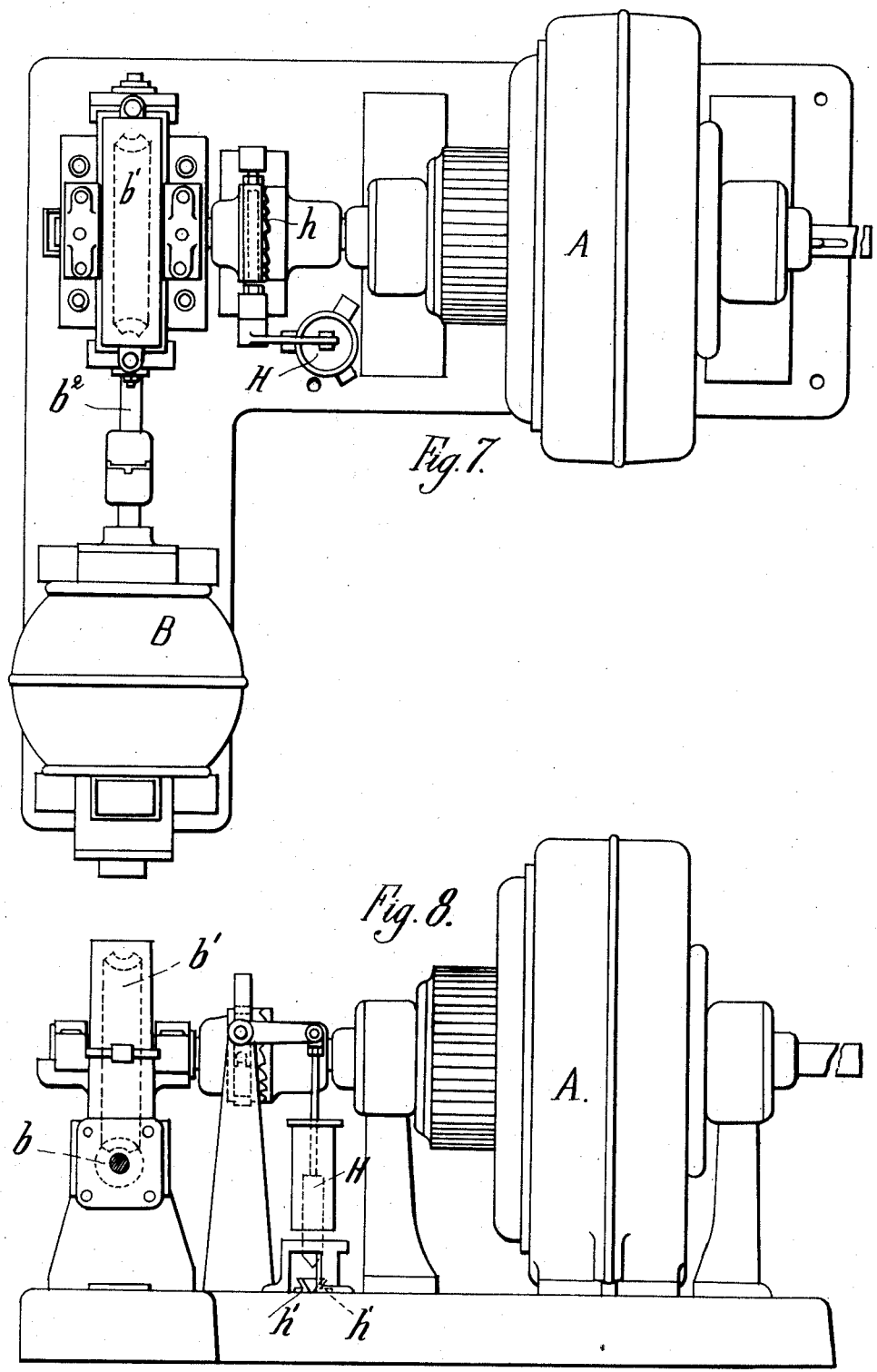

UNITED STATES PATENT OFFICE.

WALTER ANGOVE CLATWORTHY, OF NEWCASTLE-UPON-TYNE, ENGLAND, ASSIGNOR OF ONE-HALF TO J. H. HOLMES & CO., OF SAME PLACE.

MEANS FOR DRIVING MACHINES AT VARIABLE SPEEDS BY ELECTRIC MOTORS.

SPECIFICATION forming part of Letters Patent No. 629,952, dated August 1, 1899.

Application filed March 8, 1899. Serial No. 708,277. (No model.)

*To all whom it may concern:*

Be it known that I, WALTER ANGOVE CLATWORTHY, a subject of the Queen of Great Britain and Ireland, residing at Newcastle-upon-Tyne, England, have invented a new and useful Improved System and Means for Driving Newspaper-Printing or Like Machines at Variable Speeds by Electric Motors, (for which I have made application for Letters Patent in Great Britain under No. 9,802 and date April 28, 1898,) of which the following is a specification.

This invention relates to the driving at very variable speeds of newspaper-printing or like machines, in which a wide range of speed and power has been found necessary in practice; and it consists of a system of coupled electric motors and controlling adjuncts, whereby a small power and electrical current suited to such power and to the machine producing it is at command for the first slow running of such machine when leading in the paper and for an accurate adjustment of the position of the cylinders when putting on the stereos with ease for immediate stoppage at any point, and thereafter when all parts are adjusted with full power can be immediately applied without shock and with the advantage to the main motor that its armature-shaft is already in motion with a slight torque before it is called upon to exert its full driving power. These advantages have not yet been effected by any usual mode of driving such printing-machines by a single electric motor. An attempt to produce the slow motion of about five or six steady revolutions per minute required in such a printing-press for leading in and for adjustment of stereo-cylinders by a motor adapted for full power and the maximum of speed results in danger to the motor by overheating, and it is liable to stop altogether or to run away and is most uncertain of control. Complicated gearing and friction or other clutches are also objectionable and noisy.

To carry my system into effect, I provide direct and simple connection between the main and driving motor spindle and the printing-press or other like machine, and upon such spindle I mount the main electric motor direct and connect thereto an auxiliary starting-motor, the armature of the main motor being keyed direct on the shaft and the armature of the auxiliary motor engaging therewith by any suitable device, such as a self-releasing clutch, which will permit of the armature of the auxiliary motor driving the said shaft in one direction and of being left behind at rest when the main motor is driving the said shaft. For the auxiliary motor I prefer to use a light high-speed motor running at normal speed even when the printing-machine is at its slowest, and therefore gear down the auxiliary motor to the main-motor shaft, preferably by a worm and worm-wheel. This motor is only of sufficient power to drive the printing-press or other machine at the slow starting and leading-in speed, so that there is no danger of its running away. A combination starting and controlling switch is used in conjunction with the two motors and with the self-releasing clutch, which may be brought into gear against a spring or weight reaction by a solenoid or similar electric device.

The first operation of the starting-switch is to throw in the clutch-gear of the starting light motor, and the latter, which is preferably series wound, is then started through a starting resistance, driving the main-motor shaft and the printing-machine at a very slow speed, suitable for leading in. A further movement of the combination-switch brings through a resistance the full electromotive force on the larger motor, which is already in motion and partially excited, and which thus gathers up its full power without shock and the speed of which may be varied by the aforesaid switch, inserting or cutting out shunt or series resistances, as required. As the speed increases on the main motor the small motor self-releases and remains at rest.

The auxiliary-motor clutch can be operated by a hand-lever, if desired, and the small motor can be kept running for purposes of adjustment of the cylinder on stoppage of the machine until ready for printing.

In order that my invention may be the better understood, I will proceed to describe the same, reference being had to the drawings hereto annexed and to the letters and figures marked thereon.

Figure 1 is a diagrammatic plan of the circuits and relative electrical connections between the devices forming my improved electrical driving system. Fig. 1$^a$ is a detail sectional view, partly in elevation, of one of the push-button devices P. Fig. 2 is a plan, and Fig. 3 is an elevation, of the combined switch by which the system is set in operation and controlled. Fig. 4 is an end view of the same. Fig. 5 is a detached elevation of the main switch F. Fig. 6 is an end elevation of the sliding switch-block. Fig. 7 is a plan, and Fig. 8 is an elevation, of the combined main and auxiliary motors.

A is the large or main motor, and B is the small or auxiliary motor. (Shown diagrammatically as to circuit connections in Fig. 1 and as to mechanical arrangement in Figs. 7 and 8.)

C is a double contact sliding-switch serving mechanically to close the contacts or switches E, F, and J in the order named when traveling from left to right, E being the contact-switch to effect excitation of the small auxiliary motor and by a solenoid H to throw in the clutch $h$, Figs. 7 and 8, between the auxiliary motor B and the shaft of the main motor A. F is the main switch or contact for the main current, and J is the switch or contact for the main motor A, the field of this latter being excited, preferably, by a shunt-current, as shown at $a$, Fig. 1.

P P are push-buttons serving to short-circuit the electromagnets of the electrically-held switches E J.

The construction of the combined sliding switch C is as follows: The sliding double contact-block or cross-head $c$ is mounted upon a screwed shaft D, turned by a handle or wheel $d$. The cross-head $c$ carries two bridge-contacts $e\ e'$, Fig. 6, bridging between the two sets of parallel contacts G G and K K, the former for the smaller motor and the latter for the large motor, the said contacts being divided in parts with intermediate resistances to control the current as to its gradual effects upon the motors. The cross-head $c$ has a projecting nose $c'$, adapted to engage under tappets on the spindle of the switch-contacts E and J, and a right-angled projection $c^2$, operating the tappet of the switch F. The nose $c'$ is considerably elongated away from the direction of the travel of the cross-head $c$ to maintain mechanically for a short time the closure of the switch-contacts E and J, as these switch-levers are so heavily spring-pressed by a coil-spring $f^2$ about these pivots that their contact-levers will at once rise to a definite normal position, in which the tappets or the switch-axles depend vertically, by the action of such recoil-spring unless held by the nose $c'$ or by the electromagnets E' and J'. In the case of the contact-switch F this is so lightly spring-pressed that it will not automatically recoil from the jamming contact-piece and is not therefore electrically held, and in this case the pivot of the lever has a double-forked tappet $f f'$, as shown in Fig. 5, so that the switch-lever is closed by the travel of the cross-head $c$ catching one arm of the forked tappet by the narrow right-angled piece $c^2$ of the nose $c'$ in one direction and is opened by the return travel of the cross-head $c$ catching the other arm of the tappets $f f'$. In the case of the other switches when released from their electrical retention the tappets are always in a downward vertical direction when the controlling-springs are at normal and are always therefore in a position to meet the nose of the sliding cross-head $c$. Upon return of the cross-head $c$ to position on the left the said tappets are merely lifted against the spring reaction and return to normal vertical downward position ready for the return action of the cross-head from left to right to close the switches again.

The arrangement of the two motors is as follows: The main motor A has its shaft directly connected to the first-motion shaft of the driven machine, such as a newspaper-printing machine. The auxiliary motor B, with its shaft at right angles to that of the main motor, gears with a continuation of that shaft by a worm and worm-wheel $b\ b'$. The small motor may thus run at its best and highest speed while only rotating the main shaft at a slow speed, as is required.

The worm-wheel shaft of the auxiliary motor is connected to the main shaft of the motor by a sliding saw-toothed clutch $h$, operated by a lever and solenoid H. The ascent of the solenoid-core throws the clutch into gear.

When the main motor A is started and overruns the small motor B, the inclined faces of the teeth of the clutch throw the latter out of gear, at the same time depressing the solenoid-core so as to touch and connect the two contacts $h'\ h'$, Figs. 8 and 1, closing a circuit that short-circuits the electromagnet E', allowing the switch E to open and cut off the supply-current to the auxiliary motor and the solenoid, in consequence of which the small motor comes to rest.

The operation and sequence of movements is as follows: When the handle or wheel $d$ on the switch-screw (see switch drawing) is turned, the screw D is turned, causing the cross-head $c$ (carrying the bridge-contacts $e\ e'$ for the small and large motors, respectively) to travel along from left to right to close the switches and start the motors. This cross-head has a projecting nose $c'$, which first engages with a small tappet on the spindle of the small-motor switch E, which it closes against the action of a spring and holds on mechanically until further movement of the cross-head disengages the tappet. Before this latter point is reached the main switch F has been closed by the nose $c^2$ of the same cross-head in a similar manner, and this switch is held frictionally by its own spring-contacts until released by the return of the cross-head.

On closing the main switch F the electric current traverses the small-motor contact G and its resistances until it reaches the small-motor switch E. The current then follows two paths, one, 1 1, being through the switch E, around the magnetic solenoid H, then energizing both the field and the armature of the small motor B and away to the opposite pole. The other path, 2 2, is through the magnetic "hold-on-bobbin" of the small-motor switch E and of the large-motor switch J, direct to the shunt-field of the large motor and away to the opposite pole. The current in this second path does not attain its full strength until all the small-motor contacts G G and the resistances are cut out. When this point is reached, the current is strong enough to fully energize the large-motor field and the switch magnetic bobbin and to retain the switch-lever in the contact-bars by the adhesion of the iron armature on the switch-lever to the iron ends of the switch-bobbins, so that there is no further need of mechanical assistance by the cross-head. The switch-bobbin E may be short-circuited by a circuit 3 3 to contacts $h\ h'$ of the solenoid H. Both the bobbins E' and J' may be short-circuited by a circuit 4 4, closed by push-buttons P. When the current traverses the switches and the small motor and magnetic solenoid, the latter is instantly powerfully energized. The core of the solenoid is attached to the end of a lever in connection with the strap of a sliding clutch $h$, already described. When the solenoid is energized, the clutch is thrown instantly into gear. This sliding clutch is mounted (free to slide on shaft and feather) on the shaft of a bronze worm-wheel, which is driven by a steel worm directly connected to the small-motor shaft. The other half of the clutch is keyed direct to the projecting end of the large-motor shaft, the opposite end of the same being directly coupled, geared, or otherwise connected to the driving-shaft of the printing-machine. The motion of the small motor is thus transmitted through the worm-gear, clutch, and large motor to the printing-machine, the latter being driven at a very slow speed. A pair of contacts are fitted in connection with the lever, and the core of the solenoid is so arranged that when the sliding clutch is out of gear these two contacts are electrically connected, forming a low-resistance path 3 3 for the current which circulates around the small-motor switch-bobbin E', two wires being taken, one from each contact to each end of this bobbin, causing the said electromagnet E' to be cut out and the switch to be released. If the cross-head and bridge-contacts are now moved along farther, the magnetic adhesive switch J is closed in a similar manner to the other switch and held on magnetically. Current now travels through the large-motor switch-contacts K and resistances, across the bridge-contact $e$, through to the switch J, direct by the circuit 5 5 to the large-motor armature, and away to the opposite pole. As the resistances in the large-motor circuit are gradually cut out the large motor begins to drive the printing-machine and relieves the small motor of its load. The teeth or jaws of the clutch between the small-motor worm-wheel shaft and the large-motor shaft are so connected that as soon as the shaft of the large motor gains in speed on the small-motor worm-wheel shaft the sliding half of the clutch is forced to disengage. As previously explained, this sliding motion is used for closing contacts, causing short-circuiting of the magnetic bobbin of the small-motor switch E. This switch then breaks circuit and the small motor and its gear and half-clutch stop running. Further movement still of the cross-head and the bridge-contacts causes an increase in speed by inserting resistances in the large-motor field-circuit. (Contacts marked L are used for this purpose.) To stop the machine slowly, the handle and screw are turned in the reverse direction until the cross-head pushes off the main switch F, thus cutting off the supply entirely. If it should be found necessary to instantly stop the machine, a number of push-buttons P P are distributed about the printing-machine where desired, which will short-circuit the magnetic bobbins of both switches, causing the switches to break circuit. The same effect would be produced by any stoppage of the current, and the latter cannot be turned on again to the motors until the sliding switch C has been brought back to normal and the current reëstablished through B and A in succession with the proper gradation of resistance, thus protecting the motor from internal injury by too sudden an application of current.

Having now described my invention, what I claim, and desire to secure by Letters Patent, is—

1. A system of electrically driving a newspaper-printing machine or the like at very diverse speeds, consisting of, in combination, a main motor coupled or geared direct to a shaft of the driven machine; an auxiliary light high-speed motor power geared to the shaft of the main motor, adapted for economy and convenience of control when running at full power to drive the heavy driven machine at a moderate speed only a self-releasing clutch between the auxiliary motor and main driving-shaft and means operated thereby to disengage and cut out the auxiliary motor so soon as the main motor overruns the latter, substantially as described.

2. In an electrical driving device, the combination with a main and auxiliary motor operating the same driving-shaft, and a self-releasing clutch between the said motors, of an electrically-operated device, such as the core of a solenoid, adapted to connect up said clutch when energized by an electrical current, and when said clutch is mechanically released to cut off the supply-current from the auxiliary motor, and thus bring it to rest, substantially as described.

3. In an electrical driving device the combination with a main and auxiliary motor operating the same driving-shaft and a self-releasing clutch between the said motors, of a sliding combination-switch a single handle adapted to reciprocate the said switch, contacts, resistances and circuits connected thereto, adapted by one progressive movement of the switch to first start the auxiliary motor and eventually to start and regulate the speed of the main motor, substantially as described.

4. In an electrical driving device the combination with a main and auxiliary motor operating the same driving-shaft and a self-releasing clutch between said motors, of a sliding combination-switch, a single handle adapted to reciprocate said switch, contacts, resistances and circuits connected thereto and electrically-held switches in said circuits controlling the supply-current to the main and auxiliary motors and push-buttons located where desired arranged to permanently break the supply-circuit to both motors upon being operated until restored by a repetition of the movements of the sliding switch.

In witness whereof I have hereunto set my hand in presence of two witnesses.

WALTER ANGOVE CLATWORTHY.

Witnesses:
 WILLIAM HUDSON NIXON,
 HUGH IRWIN.